US009975707B2

(12) United States Patent
Garcia et al.

(10) Patent No.: US 9,975,707 B2
(45) Date of Patent: May 22, 2018

(54) STARWHEEL OR SIMILAR HANDLING ARRANGEMENT FOR TRANSPORTING BOTTLES OR SIMILAR CONTAINERS, SUCH AS FOR CONTAINING BEVERAGES OR LIQUIDS

(71) Applicants: Alberto Garcia, Toluca (MX); Rosendo Zamora, Toluca (MX)

(72) Inventors: Alberto Garcia, Toluca (MX); Rosendo Zamora, Toluca (MX)

(73) Assignee: KHS GmbH, Dortmund (DE)

( * ) Notice: Subject to any disclaimer, the term of this patent is extended or adjusted under 35 U.S.C. 154(b) by 0 days. days.

(21) Appl. No.: 15/352,077

(22) Filed: Nov. 15, 2016

(65) Prior Publication Data

US 2017/0121126 A1 May 4, 2017

(30) Foreign Application Priority Data

May 16, 2014 (EP) .................................. 14168603

(51) Int. Cl.
| | |
|---|---|
| *B65G 47/84* | (2006.01) |
| *B65G 54/02* | (2006.01) |
| *B65G 29/00* | (2006.01) |
| *F16D 1/06* | (2006.01) |
| *F16D 1/112* | (2006.01) |
| *B67C 7/00* | (2006.01) |

(52) U.S. Cl.
CPC ........... *B65G 47/846* (2013.01); *B65G 29/00* (2013.01); *B65G 54/02* (2013.01); *F16D 1/06* (2013.01); *F16D 1/112* (2013.01); *B65G 2201/0244* (2013.01); *B65G 2207/08* (2013.01); *B67C 7/0046* (2013.01)

(58) Field of Classification Search
CPC .. B65G 47/846; B65G 47/847; B65G 47/848; B65G 29/00; B65G 54/02; B65G 2201/0244; B65G 2207/08; F16G 1/112; F16G 1/06; F16D 1/112; F16D 1/06; B67C 7/0046
See application file for complete search history.

(56) References Cited

U.S. PATENT DOCUMENTS

| | | | | |
|---|---|---|---|---|
| 4,084,686 A * | 4/1978 | Calhoun | ................ | B65G 43/08 198/464.4 |
| 5,810,955 A * | 9/1998 | Seifert | .................... | B65C 9/067 156/362 |
| 8,302,767 B2 * | 11/2012 | Wilhelm | .................. | B67C 3/22 141/129 |
| 8,342,314 B2 * | 1/2013 | Michel | ................ | B29C 49/4205 198/468.5 |
| 8,752,693 B2 * | 6/2014 | Voth | ...................... | B65G 29/00 198/471.1 |
| 9,193,108 B2 * | 11/2015 | Seger | .................. | B29C 49/4205 |
| 9,567,165 B2 * | 2/2017 | Clusserath | ............. | B65G 29/00 |

(Continued)

FOREIGN PATENT DOCUMENTS

| | | |
|---|---|---|
| DE | 34 32 590 A1 | 3/1986 |
| WO | WO 2006/077051 A1 | 7/2006 |
| WO | WO 2007/125553 A1 | 11/2007 |

*Primary Examiner* — Leslie A Nicholson, III
*Assistant Examiner* — Keith R Campbell
(74) *Attorney, Agent, or Firm* — Nils H. Ljungman & Associates

(57) ABSTRACT

A starwheel or similar handling arrangement for transporting bottles or similar containers, such as for containing beverages or liquids.

20 Claims, 4 Drawing Sheets

(56) References Cited

U.S. PATENT DOCUMENTS

| 9,653,963 B2* | 5/2017 | Schmid | B67C 3/22 |
| 2011/0147169 A1* | 6/2011 | Voth | B65G 29/00 |
| | | | 198/793 |

* cited by examiner

STARWHEEL OR SIMILAR HANDLING ARRANGEMENT FOR TRANSPORTING BOTTLES OR SIMILAR CONTAINERS, SUCH AS FOR CONTAINING BEVERAGES OR LIQUIDS

CONTINUING APPLICATION DATA

This application is a Continuation-In-Part application of International Patent Application No. PCT/EP2015/059154, filed on Apr. 28, 2015, which claims priority from European Patent Application No. 14168603.0, filed on May 16, 2014. International Patent Application No. PCT/EP2015/059154 was pending as of the filing date of this application. The United States was an elected state in International Patent Application No. PCT/EP2015/059154.

BACKGROUND

1. Technical Field

The present application relates to a starwheel or similar transporting arrangement for handling bottles or similar containers, such as for containing beverages or liquids.

2. Background Information

Background information is for informational purposes only and does not necessarily admit that subsequently mentioned information and publications are prior art.

The present application relates to a container-transporting element and a container-transporting apparatus equipped therewith.

Containers, such as, for example, beverage containers, for example bottles, are transported in different types of container-transport systems, such as filling systems, labeling systems, cleaning systems, etc. For the transport of the containers, for example in an upright position, conveyor bands or belts are known, on which the containers are essentially linear conveyed. Rotating container-transporting elements are also known which include a ring element comprising a plurality of container receptacles formed at the circumference, which are transported at a rotation of the ring element. Such a container-transporting element is also designated as a transport star or a starwheel.

Some transport stars comprise a fitting part that is secured by locking elements to a ring, which is connected by spokes to a rotating hub.

In order to use containers of different sizes, it is advantageous if the container-transporting structure of a container-transporting apparatus can be easily changed.

OBJECT OR OBJECTS

An object of the present application is to provide a container-transporting element and a container-transporting apparatus with which, in one possible exemplification, handling is easier when making such a change.

SUMMARY

This object may be solved by a container-transporting element and a container-transporting apparatus according to the present application. Other possible exemplifications of the present application are described herein.

The container-transporting element according to the present application comprises a ring element with a container-transporting structure arranged at the circumference. This comprises a plurality of container receptacles. In the simplest case, these can be receptacles for accommodating containers, but it is likewise possible for additional accommodation elements, such as gripper elements, clamp elements, etc., to be provided at each container receptacle. The ring element is provided in order, when a rotation takes place, to convey the containers arranged in the container receptacles on a circular track.

In this situation, according to the present application, a magnetic holder is provided at the ring element. The magnetic holder allows for a simple attachment of the ring element to a corresponding counterpiece with a ferromagnetic holding surface. In this situation, the magnetic holder comprises at least one magnetic element, which is adjustable at the ring element, namely at least between a securing position and a release position, in which it is released from the counterpiece.

The container-transporting apparatus according to the present application provides for a rotatably arranged central element, with which the ring element is coupled by means of the magnetic holder. In at least one possible exemplification, in the securing position the magnetic element is in contact at the central element, such that the ring element is secured to the central element in a detachable manner. In the release position, the magnetic element is in one possible exemplification arranged at a distance spacing from the central element, such that the coupling is detached.

The use of a magnetic holder has proved to be possibly simple in handling. With a magnetic holder, in contrast to conventional mechanical locking devices, allows for the use of larger, smooth, and enclosed surfaces, which offers major advantages with regards to cleaning. In this situation, a magnetic holder allows for a sufficiently strong connection, by means of which the position of the container-transporting element can, for example, in one possible exemplification be secured completely to a central element. In at least one possible exemplification, for example, the height of the container-transporting element can be secured with sufficient force for subsequent operation. The holding force can also be sufficient for a connection to be established which is torsionally resistant to the torque moments which occur in operation.

In at least one possible exemplification according to the present application, the magnetic holder is arranged on the inside at the ring element. In this situation it is again possible for the magnetic element in the securing position to be arranged radially further inwards than in the release position, i.e. during the adjustment it moves at least partially radially. This allows for the magnetic element to be brought into the release position and for the ring element to be placed on a central element, such that it surrounds this. It is then possible, by adjusting the magnetic element into the securing position, for the coupling to be established.

The adjustment of the magnetic element takes place, according to a further exemplification of the present application, by means of an adjustable actuation element, such as a pivot lever. The magnetic element is then in one possible exemplification coupled to the actuation element in such a way that it is adjusted when an adjustment of the actuation element between the securing element and the release position.

For the adjustment of the magnetic element, a guide can in one possible exemplification be provided. In one possible exemplification, it is possible for the magnetic element to be mounted in the guide such as to be capable of displacement, and, at the movement between the securing position and the release position, it is guided in the guide. In one possible exemplification, the guide can be formed as a sliding guide, for example in contact on both sides of the magnetic element. As an alternative or in addition, a link guide is also possible.

In at least one possible exemplification of the present application, a plurality of magnetic holders are arranged at the ring element. These are possibly distributed uniformly over the circumference.

According to a further exemplification of the present application, it is possible for the ring element to be formed as multi-part. In this situation, the division can run possibly radially, such that, for example, half-rings, third-rings, or quarter-rings can be assembled to form a ring element. In at least one possible exemplification provided between the parts of the ring element are engagement structures, which engage into one another and in this way couple the parts of the ring element to one another. In at least one possible exemplification, in this situation a projecting engagement element is in positive fit accommodation in a matching opening of a second part of the ring element. With a subdividing of the ring element into several parts it is possible for at least one magnetic holder to be provided at each of the parts.

According to a further exemplification of the present application, at least one engagement element is provided in the interior of the ring element. With the container-transporting apparatus, for this purpose a matching engagement structure is provided at the central element, such that the engagement element engages into the engagement structure. The engagement element is in one possible exemplification a projecting element, although a cut-out recess can also be used. As a result of the engagement, on the one hand a securing of the rotational position can be achieved, if the engagement structure and the engagement element are configured in such a way that they can come into engagement in a rotational position. Additionally, by the coupling of an engagement element with the engagement structure a connection can be created which couples the ring element in the circumferential direction in positive fit with the central element, and thereby achieves a rotationally-resistant connection.

The magnetic element in one possible exemplification comprises a cambered surface. This is further in one possible exemplification aligned radially inwards in the securing position. Such a cambered surface is in one possible exemplification suitable for contact on a central element with an outer surface which is at least essentially cylindrical in shape.

According to a further exemplification of the present application, the ring element can comprise at least one first and one second ring, which are spaced axially at a distance from one another. The rings can in this situation in each case be formed in a rhomboidal shape. In at least one possible exemplification of the present application, the magnetic element is arranged in the space between the rings. In this way, a guide can be formed at the rings in a simple manner.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

An exemplification of the present application is described in greater detail hereinafter on the basis of drawings.

DESCRIPTION OF EXEMPLIFICATION OR EXEMPLIFICATIONS

Figure 1:
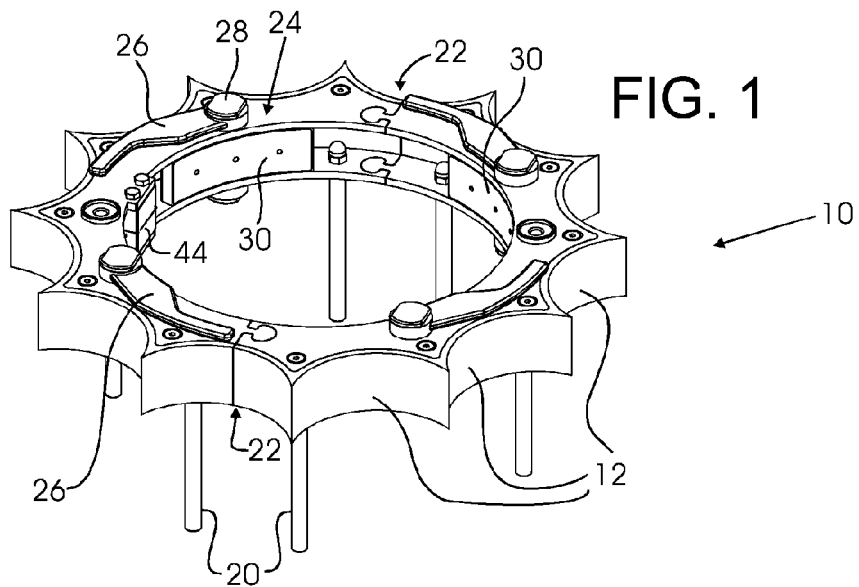
FIG. 1 shows a perspective representation of an exemplification of a container-transporting element.
Figure 6:
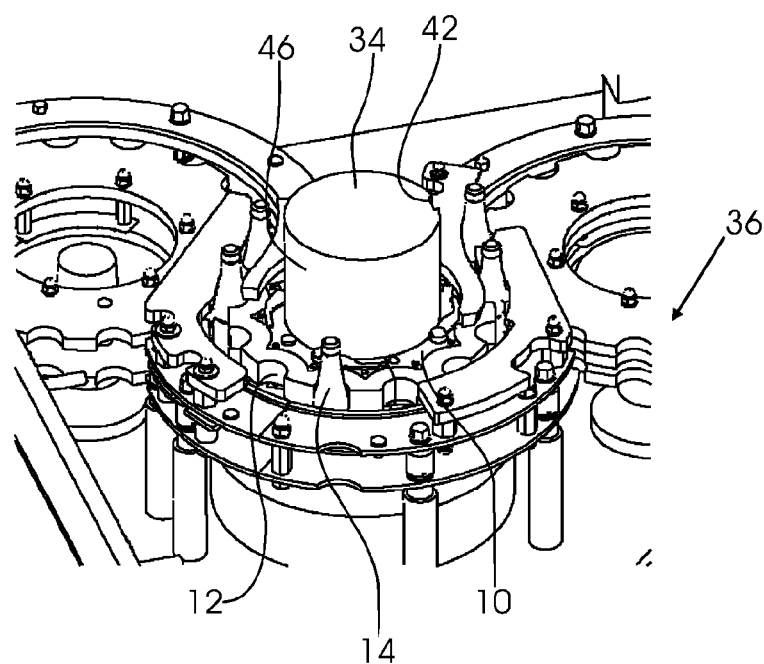

Represented in FIG. 1 is a container-transporting element (transport star) 10, represented with receptacles 12 formed at the outer circumference, in which, as can be seen for example from FIG. 6, containers which are to be transported, namely bottles, for example, can be accommodated.

Figure 3:
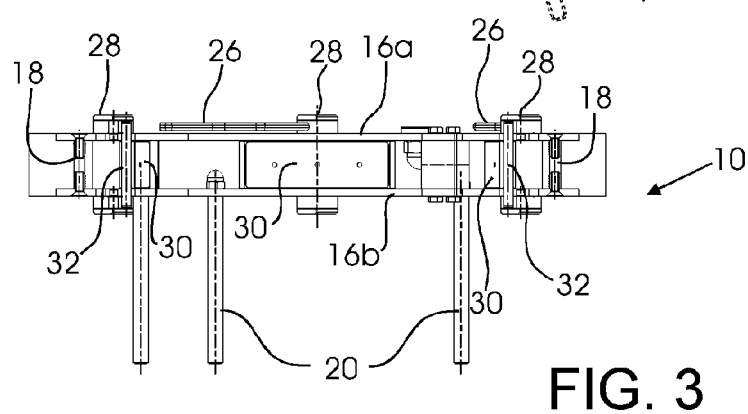
FIG. 3 shows a view of a section through the container-transporting element from FIG. 1 and FIG. 2 along the line A . . . A.

The transport star 10 comprises, as can be seen in one possible exemplification from the sectional representation in FIG. 3, a ring, which is formed from upper and lower plate-shaped ring elements 16a, 16b, which are held parallel or substantially parallel to each at an axial distance spacing by means of spacer pieces distributed over the circumference. From the lower ring element 16b, supports 20 extend in the axial direction.

Figure 2:
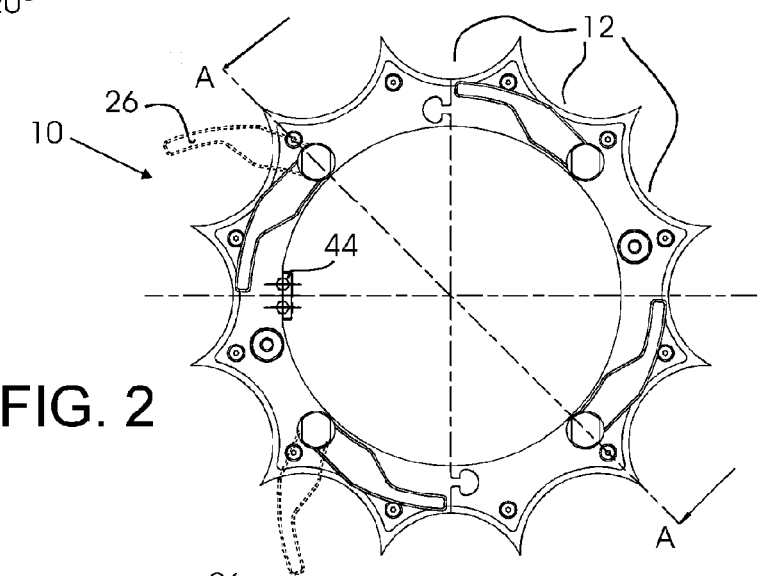
FIG. 2 shows a view from above of the container-transporting element from FIG. 1.

As can be seen in one possible exemplification from FIG. 1 and FIG. 2, the transport star 10 is divided at two opposed contact points 22 in the radial direction, such that, in the example shown, it comprises two half-rings. These are connected to each other in a detachable manner at each of the contact points 22 to both ring elements 16a, 16b, by positive fit engagement structures. In the example shown, the engagement structures are formed in each case by a projecting engagement element and a matching cut-out recess, which engage in one another in the manner of the pieces of a jigsaw puzzle.

Provided uniformly distributed at the circumference of the transport star 10 are four magnetic holders 24. These comprise in each case an actuating lever 26, which are mounted such as to be capable of pivoting in a rotary joint 28. The pivot levers 26 are, as indicated in FIG. 2, capable of pivoting outwards in the rotary joints 28.

Arranged beneath the joints 28, in each case in the space between the ring elements 16a, 16b, is a magnetic element 30. This comprises an inner magnetic surface, which is cambered with the inner radius of the transport star 10. The magnetic element can, for example, be formed as one piece from a permanently or substantially permanently magnetic material, or it comprises a plurality of individual magnetic pieces, aligned in the same direction, such as neodymium magnets.

In this situation, the magnetic elements 30 are radially adjustable between the ring elements 16a, 16b. In the securing position shown in FIG. 1, the inner magnetic surfaces of the magnetic elements 30 lie flush with the inner side of the ring elements 16a, 16b. In a release position (not represented in the figures), the magnetic elements 30 are offset radially outwards and are located at a distance spacing of, for example, approximately one to two centimeters away from the inner side of the ring elements 16a, 16b.

When the magnetic elements 30 are moved, they are guided between the ring elements 16a, 16b by contact on both sides. As well as this, as explained hereinafter, a link guide arrangement is also provided.

The adjustment of the magnetic elements 30 between the securing position and the release position takes place by means of the pivot levers 26. These can be pivoted in the joints 28 about axially-aligned pivot axes. As can be seen from the sectional view in FIG. 3, at each of the joints 28 an eccentrically mounted bolt 32 is provided, which in each case penetrates between the magnetic elements 30 arranged at the ring elements 16a, 16b. Allowed to move freely in the ring elements 16a, 16b are slots in the form of part rings (not represented in the drawings) in order to form a link guide arrangement, into which the bolts 32 can be pushed, on a pitch circle arc, when the pivot levers 26 pivot.

At the movement of the bolts 32, the magnetic elements 30 are also moved with them in tandem. Accordingly, the magnetic elements 30 are moved by the levers 26 between the two positions. As a result of the guidance by the bolts 32, this does not involve a straight, exclusively radial movement, but also a certain movement in the circumferential direction. As explained hereinafter, however, the adjustment in the radial direction is determinant, in the first instance, for the transport star being secured by means of the magnetic holders 24 to the central element 34.

Figure 4:
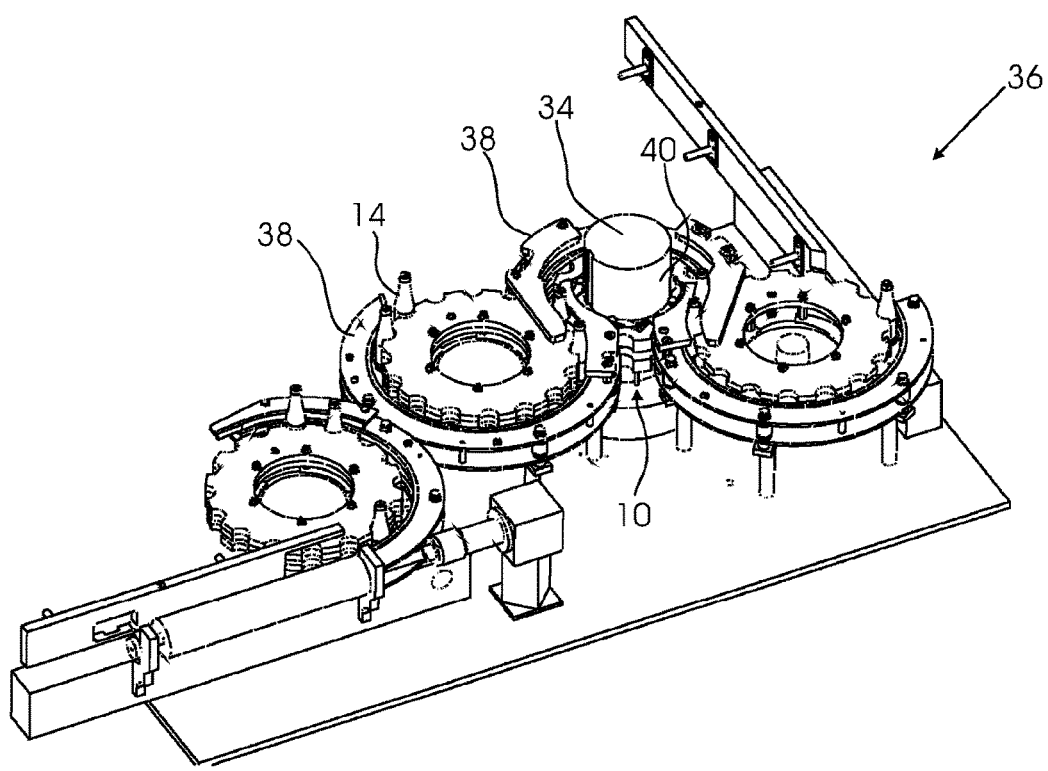
FIG. 4 shows a perspective representation of a part of a container-transporting apparatus with the container-transporting element from FIGS. 1-3.
Figure 5:
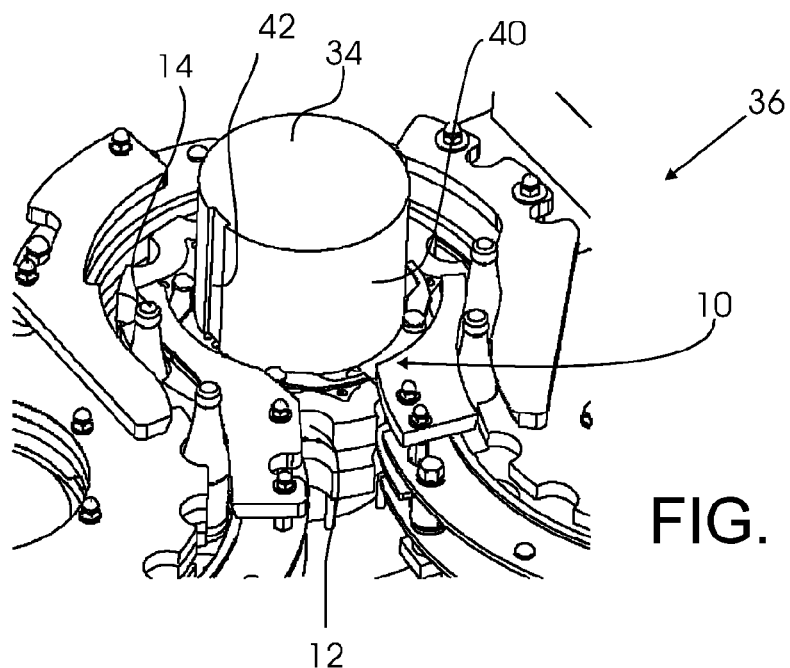
FIGS. 5 and 6 show perspective representations of parts of the container-transporting apparatus from FIG. 4.

Shown in FIGS. 4 through 6 is a container-transporting apparatus in parts. These show a number of transport stars, including the transport star 10 described heretofore. The transport stars are in each case arranged on track elements 38, in such a way that bottles 14 are moved in the receptacles 12 on an arc path when the transport stars are rotated.

The container-transporting apparatus 36 is part of a container handling system (not represented), for example for the filling, cleaning, checking of the bottles 14, etc.

The transport star 10 described heretofore is in this situation secured to an essentially cylindrical central element 34, which can be driven such as to rotate.

The supports 20 serve to position the transport star 10 at the central element 34 with regard to height. In this situation, the supports 20 lie on a rotating plate (not represented).

The transport star 10 is secured to the central element 34 by means of the magnetic holders 24. The ring, from the ring elements 16a, 16b, surrounds the central element 34. In the securing position represented in FIG. 1, the cambered inner magnetic surfaces of the magnetic elements 30 are in contact with the outer cylindrical surface 40 of the central element 34. The central element 34 is made of ferromagnetic material, such as magnetizable steel, such that the transport star 10 is held to it by the magnetic holders 24.

By means of this securing arrangement, it is already possible to achieve a sufficient retention strength with which the securing of the transport star 10 is possible, as well as the transfer of a rotational torque moment from the central element 34 onto the transport star 10. In order to support the correctly positioned alignment of the transport star 10 in relation to the central element 34, and for further improved torque transfer, a gap 42, running axially, is also formed at the central element 34, as a receptacle in which an engagement element 44 can fit precisely or substantially precisely, projecting into the interior of the ring elements 16a, 16b.

By way of the magnetic holders 24, the transport star 10 can be easily attached and detached at the central element 34, for example in order to reset the container-transporting apparatus 36 to another container size. Further exemplifications are provided in this situation by the configuration of the central element 34 with smooth outer cylindrical surfaces, with which the matching cambered surfaces of the magnetic elements 30 are in contact. This allows for possibly easy cleaning, as well as rendering more difficult the depositing of dirt contaminants (hygienic design).

Figure 7:
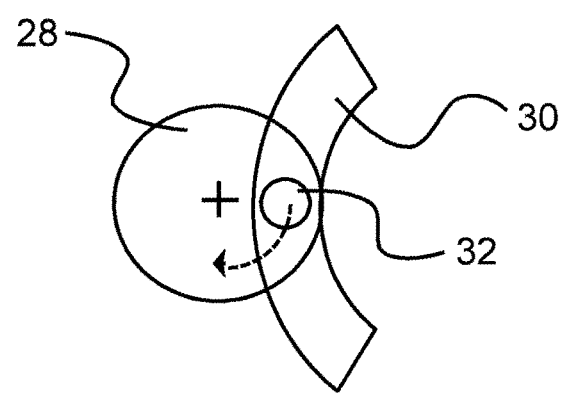
FIG. 7 shows a schematic diagram of a portion of a possible exemplification.

One possible example of a movement of the bolts 32 may be seen in a schematic depiction in FIG. 7. As can be seen, when the joint or pivot piece or pivot cylinder 28 is rotated in a clockwise (or counterclockwise as the case may be) direction, the bolt 32 follows a portion of a pitch circle or arc so as to lift and/or pull the magnetic element 30 away from its initial position in contact with the central element 34. Depending on the exact design, this movement may generate forces that are at an angle and/or tangential with respect to the central element 34, rather than forces that are radial with respect to the central element 34. As a result, one portion of the magnetic element 30 may possibly be pulled away from the central element 34 before another portion. In contrast, movement in a purely radial direction may possibly require separation of the entire contact surface of the magnetic element 30 from the central element 34 all at once. Less force therefore may be required to separate the magnetic elements 30 from the central element 34 according to the design shown in FIG. 7, than if the magnetic elements 30 were moved in solely a radial direction with respect to the central element 34.

A container-transporting element 10 and a container-transporting apparatus are hereby described. The container-transporting element 10 has at least one ring element. A container-transporting structure with a plurality of container receptacles 12 is provided on the circumference. In order to permit easier handling, in one possible exemplification when changing a container-transporting structure, the ring element has at least one magnetic holder 24. A magnetic element 30 is adjustable at least between a securing position and a release position.

One feature or aspect of an exemplification is believed at the time of the filing of this patent application to possibly reside broadly in a container-transporting element comprising at least one ring element 16a, 16b with a container-transporting structure formed at the circumference with a plurality of container receptacles 12, wherein the at least one ring element 16a, 16b comprises at least one magnetic holder 24, with a magnetic element 30, which is adjustable at least between a securing position and a release position.

Another feature or aspect of an exemplification is believed at the time of the filing of this patent application to possibly reside broadly in the container-transporting element, wherein the magnetic element 30 in the securing position is arranged radially further inwards than in the release position.

Yet another feature or aspect of an exemplification is believed at the time of the filing of this patent application to possibly reside broadly in the container-transporting element, wherein at least one adjustable actuating element 26 is provided at the magnetic holder 24, wherein the magnetic element 30 is adjusted when an adjustment takes place of the actuating element 26.

Still another feature or aspect of an exemplification is believed at the time of the filing of this patent application to possibly reside broadly in the container-transporting element, wherein a pivot lever 26 is provided as the actuating element.

A further feature or aspect of an exemplification is believed at the time of the filing of this patent application to possibly reside broadly in the container-transporting element, wherein the magnetic element 30 is mounted such as to be movable in a guide, in order to allow for a movement between the securing position and the release position.

Another feature or aspect of an exemplification is believed at the time of the filing of this patent application to possibly reside broadly in the container-transporting element, wherein a plurality of magnetic holders 24 are arranged at the ring element 16a, 16b.

Yet another feature or aspect of an exemplification is believed at the time of the filing of this patent application to possibly reside broadly in the container-transporting element, wherein the ring element 16a, 16b is formed as multi-part, wherein engagement structures 22 are provided between the parts of the ring element.

Still another feature or aspect of an exemplification is believed at the time of the filing of this patent application to possibly reside broadly in the container-transporting element, wherein at least one magnetic holder 24 is provided at each of the parts of the ring element 16a, 16b.

A further feature or aspect of an exemplification is believed at the time of the filing of this patent application to possibly reside broadly in the container-transporting element, wherein at least one engagement element 44 is provided in the interior of the ring element 16a, 16b.

Another feature or aspect of an exemplification is believed at the time of the filing of this patent application to possibly reside broadly in the container-transporting element, wherein the magnetic element 30 comprises a cambered surface aligned radially inwards in the securing position.

Yet another feature or aspect of an exemplification is believed at the time of the filing of this patent application to possibly reside broadly in the container-transporting element, wherein the ring element 16a, 16b comprises at least one first ring 16a, 6b and a second ring 16a, 16b spaced axially at a distance from it, wherein the magnetic element 30 is arranged between the first and the second ring.

Another feature or aspect of an exemplification is believed at the time of the filing of this patent application to possibly reside broadly in a container-transporting apparatus comprising a central element 34 arranged such as to be rotatable, and a ring element 10 according to the present application, wherein the ring element 10 is coupled by the magnetic holder 24 to the central element 34.

Yet another feature or aspect of an exemplification is believed at the time of the filing of this patent application to possibly reside broadly in the container-transporting apparatus, wherein at least one engagement element 44 is arranged in the interior of the ring element 16a, 16b, and a matching engagement structure 42 is provided at the central element 34, and the engagement element 44 engages into the engagement structure 42.

Yet another feature or aspect of an exemplification is believed at the time of the filing of this patent application to possibly reside broadly in the container-transporting apparatus, wherein the central element 34 comprises an outer surface 46 which is at least essentially cylindrical.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patent document is hereby incorporated by reference as if set forth in its entirety herein except for the exceptions indicated herein: WO 2006/077051 A1, having the title "TRANSPORT STAR WHEELS", published on Jul. 27, 2006.

All of the patents, patent applications, patent publications, and other documents, except for the exceptions indicated herein, which were cited in the International Search Report dated Oct. 7, 2014, and/or cited elsewhere, as well as the International Search Report document itself, are hereby incorporated by reference as if set forth in their entirety herein except for the exceptions indicated herein, as follows: WO2007125553, having the title "STAR WHEEL", published on Nov. 8, 2007; and DE3432590, having the English translation of the German title "Preliminary table for receptacle handling machines", published on Mar. 13, 1986.

The corresponding foreign and international patent publication applications, namely, European Patent Application No. 14168603.0, filed on May 16, 2014, having inventors Alberto GARCIA and Rosendo ZAMORA, and International Application No. PCT/EP2015/059154, filed on Apr. 28, 2015, having WIPO Publication No. WO 2015/173004 A1, and inventors Alberto GARCIA and Rosendo ZAMORA, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in Europe and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2015/059154 and European Patent Application 14168603.0, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2015/059154 and EP 14168603.0 from which this patent application claims priority which do not have to do with the correction of the translation in this patent application are not to be included in this patent application in the incorporation by reference.

Any statements about admissions of prior art in the original foreign patent applications PCT/EP2015/059154 and EP 14168603.0 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A container-transporting element comprising:
   at least one ring element;
   a plurality of container receptacles being disposed about an outer circumferential portion of said at least one ring element;
   at least one magnetic holder being mounted on said at least one ring element; and
   said at least one magnetic holder comprising a magnetic element configured to be adjusted at least between a securing position, in which said at least one ring element is magnetically connected and held on to a rotatable drive, and a release position, in which said at least one ring element is magnetically disconnected from a rotatable drive.

2. The container-transporting element according to claim 1, wherein:
   said magnetic element is configured to be adjusted from said release position to said securing position by moving said magnetic element away from said outer circumferential portion of said at least one ring element toward an inner portion of said at least one ring element; and
   said magnetic element is configured to be adjusted from said securing position to said release position by moving said magnetic element away from said inner portion of said at least one ring element toward said outer circumferential portion of said at least one ring element.

3. The container-transporting element according to claim 2, wherein:
   the container-transporting element further comprises at least one movable mechanical connector disposed at said at least one magnetic holder; and
   said at least one movable mechanical connector is operatively connected to said magnetic element and configured to be moved to move said magnetic element between said release position and said securing position.

4. The container-transporting element according to claim 3, wherein said at least one movable mechanical connector comprises a pivot lever.

5. The container-transporting element according to claim 4, wherein:
   the container-transporting element further comprises at least one guide structure; and
   said magnetic element is movably mounted in said guide structure.

6. The container-transporting element according to claim 5, wherein said at least one magnetic holder comprises a plurality of magnetic holders.

7. The container-transporting element according to claim 6, wherein:
   said at least one ring element comprises at least two sections; and
   each of said at least two sections comprises a mechanical connector configured to be connected to one another to connect said at least two sections together to form said at least one ring element.

8. The container-transporting element according to claim 7, wherein at least one of said plurality of magnetic holders is disposed at each of said at least two sections of said at least one ring element.

9. The container-transporting element according to claim 8, wherein:
   said at least one ring element comprises at least one engagement element, which said at least one engagement element comprises a projection or a slot disposed on the interior of said at least one ring element; and
   said at least one engagement element is configured to engage a rotatable drive to position and maintain said at least one ring element in a desired position on the rotatable drive.

10. The container-transporting element according to claim 9, wherein each of said magnetic elements comprises a cambered or curved surface disposed to face toward the interior of said at least one ring element.

11. The container-transporting element according to claim 10, wherein:
    said at least one ring element comprises a first ring element and a second ring element spaced apart from one another; and
    said magnetic elements are disposed between said first ring element and said second ring element.

12. The container-transporting element according to claim 1, wherein:
    the container-transporting element further comprises a rotatable drive;
    said at least one ring element is disposed around said rotatable drive; and
    said at least one ring element is configured to be magnetically secured to said rotatable drive by said magnetic holder upon said magnetic element being in said securing position.

13. The container-transporting element according to claim 12, wherein:
    said at least one ring element comprises at least one engagement element, which said at least one engagement element comprises a projection or a slot disposed on the interior of said at least one ring element;
    said rotatable drive comprises at least one engagement structure, which said at least one engagement structure comprises a projection or a slot configured to match said at least one engagement element; and
    said at least one engagement element is configured to engage said at least one engagement structure configured to position and maintain said at least one ring element in a desired position on said rotatable drive.

14. The container-transporting element according to claim 13, wherein said rotatable drive comprises an essentially cylindrical outer surface.

15. The container-transporting element according to claim 12, wherein:
said magnetic element is configured to be adjusted from said release position to said securing position by moving said magnetic element into contact with said rotatable drive; and
said magnetic element is configured to be adjusted from said securing position to said release position by moving said magnetic element away from and out of contact with said rotatable drive.

16. The container-transporting element according to claim 15, wherein:
the container-transporting element further comprises at least one pivot lever disposed at said at least one magnetic holder; and
said at least one pivot lever is operatively connected to said magnetic element and configured to be pivoted to move said magnetic element between said release position and said securing position along a non-linear path.

17. The container-transporting element according to claim 16, wherein:
said at least one magnetic holder comprises a plurality of magnetic holders;
said rotatable drive comprises an essentially cylindrical outer surface; and
each of said magnetic elements comprises a curved surface configured to match said essentially cylindrical outer surface of said rotatable drive.

18. The container-transporting element according to claim 17, wherein:
said at least one ring element comprises at least two sections; and
each of said at least two sections comprises a mechanical connector configured to be connected to one another to connect said at least two sections together to form said at least one ring element.

19. The container-transporting element according to claim 18, wherein at least one of said plurality of magnetic holders is disposed at each of said at least two sections of said at least one ring element.

20. The container-transporting element according to claim 19, wherein:
said at least one ring element comprises a first ring element and a second ring element spaced apart from one another; and
said magnetic elements are disposed between said first ring element and said second ring element.

* * * * *